United States Patent [19]
Kreider

[11] 3,860,544
[45] Jan. 14, 1975

[54] HIGH OPACITY RESIN COATINGS OF EMULSION POLYMERS

[75] Inventor: Robert W. Kreider, St. Charles, Ill.

[73] Assignee: DeSoto, Inc., Des Plaines, Ill.

[22] Filed: Apr. 18, 1972

[21] Appl. No.: 245,266

[52] U.S. Cl. ........ 260/29.6 T, 260/17 A, 260/17 R, 260/29.6 RB, 260/29.6 RW, 260/29.6 TA, 260/29.6 MH, 260/29.6 ME
[51] Int. Cl. ............................................. C08f 45/28
[58] Field of Search ............. 260/29.6 T, 29.6 MH, 29.6 ME, 260/29.6 RB, 29.6 TA, 29.6 RW, 878 R, 885

[56] References Cited
UNITED STATES PATENTS

| | | | |
|---|---|---|---|
| 3,358,054 | 12/1967 | Hardt et al. | 260/17 R |
| 3,554,789 | 1/1971 | Kigane et al. | 260/29.6 ME |
| 3,639,512 | 2/1972 | Sugimoto et al. | 260/878 R |
| 3,669,728 | 6/1972 | Seiner | 260/17 R |

Primary Examiner—Lucille M. Phynes
Attorney, Agent, or Firm—Dressler, Goldsmith, Clement & Gordon, Ltd.

[57] ABSTRACT

An aqueous latex coating composition adapted to deposit films which dry to form a layer of high opacity is provided by absorbing within the polymer particles of the aqueous latex a small amount of an aliphatic organic solvent, such as mineral spirits, which is essentially immiscible in the aqueous phase of the latex and which causes the polymer to fracture, and by introducing into the aqueous phase an at least partially water miscible organic solvent, such as propylene glycol, having a lower evaporation rate than the aliphatic solvent. When the aliphatic solvent evaporates, a film is formed which is extensively fractured, the secondary solvent serving to maintain these fractures and thereby increase the opacification which is obtained.

9 Claims, No Drawings

HIGH OPACITY RESIN COATINGS OF EMULSION POLYMERS

The present invention is directed to the provision of aqueous latex coating compositions in which the resin particles of the latex are constituted by polymer of low opacity, the deposited latex drying to produce a film which is opaque because it is fractured to scatter light.

It is known in the application of aqueous latex coating compositions to include a small proportion of organic solvent in the latex, this organic solvent normally functioning to enhance the coalescence of the polymer particles in the film which is deposited. This may aid in the formation of a continuous film using resin particles possessing a high glass transition temperature, but it does not contribute to the development of film opacity. Indeed, such a solvent by encouraging the formation of a continuous and uniform film, may actually serve to reduce film opacity. It is also possible to include in the aqueous latex, a proportion of water immiscible organic solvent, such as xylene, the xylene solvent being absorbed into the polymer particles to swell the same. When an aqueous latex coating composition containing resin particles swollen with water immiscible organic solvent is deposited and dried, the water immiscible solvent evaporates from the film which is formed, producing porosities or cells. As will be understood, the presence of porosities or cells causes light scattering and internal reflection to take place which provides an appearance of opacity. However, the xylene-swollen cells are soft and the cell walls have little strength. As a result, the cellularity which is induced is limited, apparently because many of the cells collapse and this limits the opacity which is obtained. In a companion application Ser. No. 239,719, filed Mar. 30, 1972, now U.S. Pat. No. 3,819,542, granted June 25, 1974 I have suggested the use of a secondary solvent to help maintain and accentuate the opacity which is desired.

In accordance with the present invention, I have found that when a small amount of an aliphatic organic solvent which is essentially immiscible in the aqueous phase of the latex and which causes the resin to fracture is used, and when a secondary organic solvent is employed which is at least partially water miscible so that the secondary solvent remains largely in the aqueous phase of the latex, this secondary organic solvent having a lower evaporation rate than the aliphatic solvent and a low capacity for solvating the resin particles of the latex, then as the aliphatic solvent evaporates during film formation, it induces film crazing or microfracturing, and these microfractures are better maintained during the evaporation process by the presence of the secondary solvent. As a result, a much greater opacification is obtained. Solvents causing fracturing are well known, and these are generally poor solvents, usually hydrocarbon solvents.

It is theorized that the secondary organic solvent enters the fractures which are produced as the aliphatic solvent evaporates from the resin particles. In this way, it is thought that the microfractures are maintained and are prevented from healing as the water evaporates from the film to stabilize the same. At the same time, the secondary solvent with its low solvating capacity increases the dimensional stability of the film. By the time the aliphatic solvent evaporates, the film as well as the fractures therein are stabilized so that, and with the passage of time, the secondary solvent evaporates exposing air spaces in the fractures to produce the light scattering and internal reflection which create the appearance of opacity.

It is also possible that the secondary solvent cooperates with the aliphatic solvent in the production of the microfractures.

It is also possible that the secondary solvent may fill the cracks and become entrapped within the cracks as the dispersed polymer particle attempts to heal itself. Thus, when the polymer particles coalesce, the propylene glycol remains entrapped and, when it later evaporates, voids are left in what was originally the fracture formed by the presence and evaporation of the aliphatic solvent.

It is desired, however, to point out that the above theoretical discussion is not a limitation of this invention and, indeed, it is difficult to verify theoretical considerations because the microfractures which are formed are exceedingly small and are hard to see using an ordinary optical microscope. Additionally, the microfractures are largely invisible when filled with solvent and produce considerable light scattering when devoid of solvent so that, in either event, they are hard to see.

Referring first to the polymer particles which are dispersed in the aqueous continuum of the latex, the chemical nature of these polymer particles is of secondary importance. In preferred practice, and for the purpose of forming a film which will dry, it is preferred to employ a polymer particle having a low glass transition temperature below 25°C., preferably below 0°C. However, polymer particles possessing higher glass transition temperatures may be used, especially when a moderate bake is used to enhance the coalescence of the polymer particles.

There is also normally employed a dispersing agent in order that the polymer particles will be stably dispersed in the aqueous continuum of the latex. The dispersing agent is normally constituted by a surface active agent which preferably includes a proportion of nonionic or anionic surface active agent or a mixture thereof. These surface active agents are normally present as the result of copolymerization in aqueous emulsion. Excessive proportions of surfactant, especially nonionic surfactant, can plasticize the polymer particles, and undesirably soften them and should be avoided. Excessive aliphatic solvent above that small amount absorbed by the polymer particles should be avoided since it adversely affects the stability of the latex.

As will later be more fully discussed, the aliphatic solvent is selected for its capacity to cause crazing or microfracturing and the secondary solvent is selected based on its water miscibility and its very limited capacity to solvate the polymer which is employed in the polymer particles, and these selections will vary depending upon which polymer is selected. Thus, and while the chemical constitution of the polymer particle is not of primary significance, the chemical constitution of the polymer must be kept in mind in order to properly determine which organic solvents can be used.

In the preferred practice of this invention, the polymer particles are constituted by a copolymer of 20% by weight of ethylene with 80% by weight of vinyl acetate produced by copolymerization in aqueous emulsion. This provides a latex containing at least 20% by weight of polymer particles with the surfactant used being present in an amount below the critical micelle concentration so that the polymer particles can be used as a seed within which an approximately equal proportion of styrene is post polymerized. The composite polymer particles so-produced and their production are more fully described in my companion, now abandoned application Ser. No. 239,303, filed Mar. 29, 1972. This same application discloses other polymer particles which may be used herein. As pointed out in said application, the final aqueous latex has a continuous aqueous phase in which is stably dispersed polymer particles of low glass transition temperature (below 25°C., preferably below 0°C.) having monomer which produces a polymer of high glass transition temperature (above 30°C.) polymerized therein.

On the other hand, the polymer particles need not be composite particles as described in my said application, but these may instead be polystyrene or polymethyl methacrylate emulsion polymers or emulsion copolymers containing styrene, methyl methacrylate or the like, together with, for purposes of illustration, from 5-25% of ethyl acrylate or butyl methacrylate or other monovinyl ester. When the noted homopolymers are used, baking is needed to form a continuous film. Mixtures of polymer particles of low glass transition temperature with polymer particles of high glass transition temperature are also useful as, for example, 50 parts polystyrene latex with 50 parts of a 20/80 ethylene-vinyl acetate copolymer latex. The air dry films made in this manner exhibit the opacity which is the primary purpose of this invention, but the blocking resistance obtained using composite particles and the physical toughness and adhesion obtained using composite particles is not duplicated. It is again stressed that all that is required herein from the standpoint of the polymer particle and the aliphatic solvent is that the polymer particles be stably suspended in the aqueous medium and be capable of absorbing a small amount of an aliphatic organic solvent capable of inducing microfracturing.

From the standpoint of the proportion of aliphatic solvent, from about 1 to about 35 parts of aliphatic solvent may be used so long as the polymer particles can completely absorb the same. Indeed, it has been found that as little as 3 parts by weight of the aliphatic solvent is enough to induce a significant degree of microfracturing on drying. It is preferred, however, to use a larger proportion of aliphatic solvent, e.g., at least about 10, up to about 25 parts by weight of aliphatic solvent per 100 parts by weight of polymer. It will be kept in mind that, from the practical standpoint, it is desired to employ as little organic solvent as is consistent with the development of the best opacity, and the use of aliphatic solvents helps to minimize overall solvent consumption.

The aliphatic solvent which is employed should be water immiscible and absorbed by the polymer. By this, it is meant that substantially all of the aliphatic solvent which is initially placed in the aqueous phase migrates from this phase into the polymer particles in order to be absorbed by the same. If any perceptible aliphatic solvent remains in the aqueous phase, it tends to separate and cause difficulty. The aliphatic solvent on being absorbed into the polymer particle fractures the same, either immediately or on evaporation. The selection of aliphatic solvents to cause fracturing of resins is itself well known, and many combinations of solvent and polymer which will result in fracturing are known to the plastics industry. The use of a small amount of divinyl benzene or polyacrylate or the like to cross-link the polymer particle does not greatly change the tendency to fracture.

Polystyrene, polyvinyl toluene, and polymethyl methacrylate are well known to microfractures in the presence of aliphatic solvents such as mineral spirits, naphtha, hexane, butane, kerosene, octyl alcohol, and the like, and any polymer particle containing any significant proportion of any of the above can be used with any of these solvents.

While the aliphatic solvent can be used alone, a water immiscible organic solvent which swells the polymer particle, such as xylene, toluene, butyl Carbitol acetate, and the like, can be used to enhance the capacity of the polymer to absorb the aliphatic solvent. The swelling solvent is preferably used in small amount, less than 10 parts thereof per 100 parts of polymer. Thus, 5 parts of xylene per 100 parts of polymer can assist in the absorption of 30 parts of mineral spirits, somewhat more than can be normally tolerated.

The solvents which induce microfracturing or crazing are not only well known, but any question of whether a particular solvent will induce this known phenomenon is easily resolved by moistening a dry film of the resin under consideration to directly observe the whiteness which is produced.

It is desired to stress that in my companion application Ser. No. 239,719, filed Mar. 30, 1972, the primary organic solvent is relied upon to swell and soften the dispersed polymer particles. The aliphatic solvents having the capacity to induce crazing which are used herein do not normally induce any significant softness and, especially when used in smaller proportion, do not cause great swelling. Nonetheless, some softening and swelling may be induced and it is possible that some of the opacity induced by this invention is attributable to the mechanisms described in the companion application here being discussed. The distinguishing feature of this invention is the acheivement of opacity through a fracturing mechanism which enables smaller proportions of solvent to exert a greater opacifying effect and which enables more innocuous and inexpensive solvents, such as mineral spirits, to be employed with such great effectiveness.

The secondary organic solvent constitutes the key to this invention in the combination under consideration. First, the secondary solvent must be at least partially water miscible so that the major proportion thereof remains in the water phase and does not migrate into the polymer particles until after the latex has been deposited and the water content of the latex largely evaporated. Preferred secondary solvents in accordance with this invention are illustrated by ethylene glycol, diethylene glycol, propylene glycol, butylene glycol, polyethylene glycol having a molecular weight of about 150, and the like.

After the latex is deposited and a portion of the water evaporates, the water miscible organic solvent in the aqueous phase concentrates about the polymer particles in the deposited film and, it is thought, fills the fractures which have been formed by the fracturing tendency of the aliphatic solvent. For this purpose and in normal practice, at least 20 parts of secondary solvent are desirably present per 100 parts of polymer particle. As little as about 5 parts of secondary solvent on the same basis provides limited improvement.

It is particularly preferred to employ mineral spirits in combination with propylene glycol. These solvents are inexpensive and have relatively little odor or toxicity. In addition, these specific solvents induce high opacity, possibly because the two solvents together emphasize the craze-inducing action of the mineral spirits. On the other hand, mineral spirits used with no water miscible solvent or propylene glycol used as the only solvent have each been tried and I have been unable to induce any measureable opacification.

It is also preferred to employ polymer particles which are at least 0.5 micron in average diameter since, when these are fractured, the fractures are larger and have a greater opportunity to interfere with the passage of light.

It is also preferred to dry the films of this invention at about room temperature. At higher temperatures, the capacity of the fractured resin to become soft and to heal itself is increased, thus reducing the opacification which is obtained.

The invention is illustrated in the examples which follow, in which all parts are by weight.

EXAMPLE 1

1512 parts of an ethylene-vinyl acetate seed polymer latex (see note 1) are mixed with 304.0 parts of distilled water in a 3 liter flask. The ethylene-vinyl acetate polymer contains about 20% ethylene, 80% vinyl acetate, with a trace (0.15%) of methacrylic acid. The latex has a solids content of 52.8% and the particles have an average particle size of 0.46 micron (by light scattering).

16 parts of divinyl benzene (commercial material containing 53% divinyl benzene, balance largely styrene, vinyl toluene and ethylbenzene) are dissolved in 768 parts of styrene, and the solution is added to the seed latex in the flask with stirring for 15 minutes. Heat is slowly applied (45 minutes) until the flask contents are at 65°C. at which time there is added a solution of 4.0 parts potassium persulfate in 160 parts of distilled water. The temperature is maintained at 65°C. and a solution of 26.6 parts of the sodium salt of dodecyl benzene sulfonic acid in 488 parts of distilled water is slowly added over a period of 1½ hours. In this way, the latex is maintained close to its point of instability to minimize the proportion of anionic surfactant in the water phase. The 65°C. temperature is then maintained for an additional 3½ hours whereupon the product is cooled to 30°C., removed from the flask, and filtered through a 60 mesh screen.

Note 1 — The seed polymer latex is made by pre-charging a pressure vessel with 2500 grams of water, 44 grams of hydroxyethyl cellulose, 6.6 grams of sodium bicarbonate, 154 grams of an ethylene oxide concensate with isooctyl phenol (10 mols of oxide per mol of phenol), and 22 grams of potassium persulfate. The feed lines to the vessel are rinsed with 1252 grams of water (degassed). It is estimated that the pressure vessel included 35 grams of residual water from a previous run. The reactor is closed and then heated with agitation and, at 80°C., the vessel is pressurized with ethylene to a pressure of 800 p.s.i.g. Also, at 80°C., vinyl acetate containing a trace of glacial methacrylic acid is added slowly. Over 2½ hours, 3513.4 grams of vinyl acetate and 6.6 grams of methacrylic acid are added while the temperature of 80°C. and the pressure of 800 p.s.i.g. are maintained. Then, 4.5 grams of potassium persulfate in 220 grams of water are added rapidly and the feed lines are rinsed into the vessel with 160 grams of water (it is estimated that 60 grams of water are held up in the feed lines). The temperature is then raised to 85°C. and held for 1 hour before cooling to provide the desired final product.

It is desired to point out that Example 1 provides an aqueous latex containing dispersed composite polymer particles. On coating and air drying, these polymer particles coalesce to form a hard, tough and adherent continuous film on metal, paper, glass, etc. The polymer particles, by microscopic examination, have an average particle size of about 1 micron. The deposited film, without pigment, is translucent and has a contrast ratio of 0.15 at about 1.5 mil dry film thickness.

EXAMPLE 2

213 grams of the latex of Example 1 (100 grams of polymer solids) are placed in a flask. 6 grams of the ethylene oxide condensate with isoctyl phenol (10 mols of the oxide per mol of the phenol) are dissolved in 50 grams of propylene glycol and 20 grams of mineral spirits are blended in forming a crude emulsion. ½ gram of powdered hydroxy ethyl cellulose is slurred into the emulsion. This slurry is then added to the latex in the flask with stirring at room temperature. A 10% sodium bicarbonate aqueous solution is then added slowly with agitation to raise the pH to 7.4 and stirring is continued for 1 hour. At the end of 1 hour agitation, the hydroxy cellulose has been hydrated to provide desired viscosity, and all the mineral spirits has been absorbed as evidenced by the fact that no phase separation occurs on standing and no oily particles separated on drawdown.

The latex so-provided is then drawn down on various substrates, paper, metal, glass, wood, plastic, etc. to deposit a film which air dries. A 6 mil wet film was drawn down on sealed paper black on one end and white on the other (a hiding power chart). The air dried film was initially translucent, with a contrast ratio of about 0.15. After 20 hours of further exposure to the air, the contrast ratio rose to about 0.92.

The divinyl benzene in Example 1 is not regarded to be essential, though it may contribute slightly to obtaining the best result and is presently regarded to constitute preferred practice.

The invention is defined in the claims which follow.

I claim:

1. An aqueous latex coating composition adapted to deposit a film of low opacity resin which dries to produce a film of high opacity, consisting essentially of an aqueous continuous phase having stably suspended therein polymer particles of low opacity organic solvent-soluble resin consisting essentially of emulsion polymers or emulsion copolymers having a glass transition temperature below 25°C., said polymer particles having absorbed therein an aliphatic organic solvent which is immiscible in the aqueous phase of said latex, said aliphatic solvent being present in an amount of from about 1 to about 35 parts per 100 parts by weight of polymer and being a volatile aliphatic hydrocarbon, there being no perceptible aliphatic solvent remaining in the aqueous phase of said latex, and at least 5 parts per 100 parts by weight of polymer of a secondary water-miscible organic solvent in said aqueous phase, said secondary organic solvent having a low capacity for solvating said polymer and a lower evaporation rate than said aliphatic solvent and being a volatile glycol, whereby, when said latex is deposited and dried, said solvents will evaporate to produce a relatively opaque film.

2. An aqueous latex coating as recited in claim 1 in which said aliphatic organic solvent is mineral spirits.

3. An aqueous latex coating as recited in claim 1 in which said polymer particles are particles of emulsion polymer having a glass transition temperature below 25°C. modified by having monomer which produces a polymer having a glass transition temperature above 30°C. post polymerized in their presence by emulsion polymerization.

4. An aqueous latex coating as recited in claim 3 in which said polymer particles are particles of ethylene-vinyl acetate emulsion copolymer having a monomer selected from the group of styrene, vinyl toluene and methyl methacrylate polymerized in an emulsion of said copolymer.

5. An aqueous latex as recited in claim 1 in which mixtures of emulsion polymer particles of low glass transition temperature with emulsion polymer particles of high glass transition temperature are used.

6. An aqueous latex as recited in claim 1 in which said secondary solvent is propylens glycol used in an amount of at least 20 parts per 100 parts of polymer.

7. An aqueous latex as recited in claim 1 in which said polymer particles include emulsion polymer particles having a glass transition temperature below 25°C.

8. An aqueous latex as recited in claim 1 in which said polymer particles include emulsion polymer or emulsion copolymer containing styrene or methyl methacrylate.

9. An aqueous latex as recited in claim 1 in which said primary solvent is at least 3 parts by weight of mineral spirits per 100 parts of polymer, and said secondary solvent is propylene glycol.

* * * * *